Feb. 6, 1962 G. F. SKALA 3,019,692
CONDENSATION NUCLEI OPTICAL MEASURING APPARATUS
Filed Aug. 30, 1957
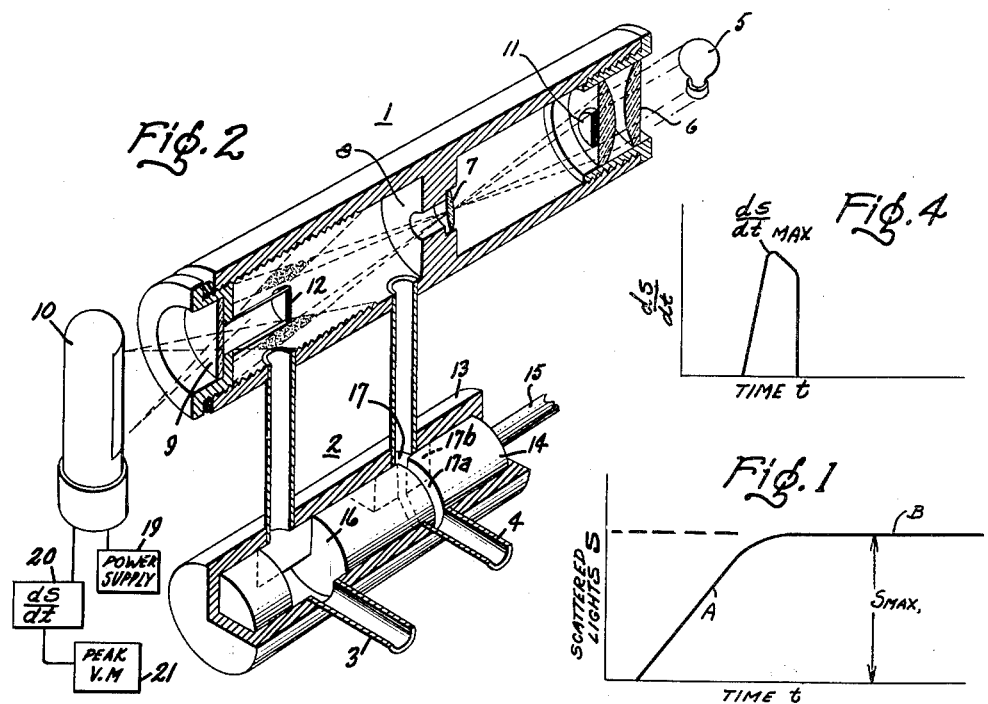
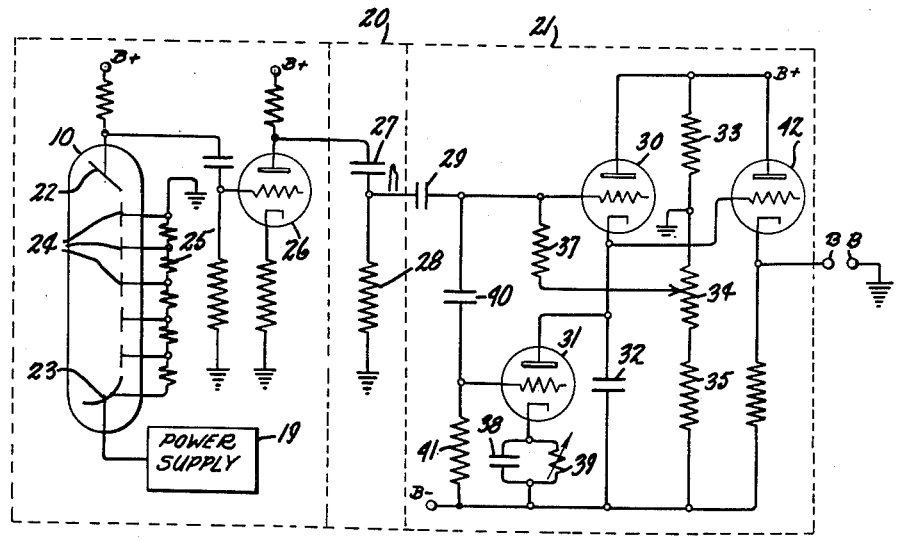
Inventor
George F. Skala,
by J. David Blumenfeld
His Attorney.

United States Patent Office 3,019,692
Patented Feb. 6, 1962

3,019,692
CONDENSATION NUCLEI OPTICAL MEASURING APPARATUS
George F. Skala, Schenectady, N.Y., assignor to General Electric Company, a corporation of New York
Filed Aug. 30, 1957, Ser. No. 681,414
5 Claims. (Cl. 88—14)

The instant invention relates to an apparatus for measuring small airborn particulate matter and more particularly of the type known as condensation nuclei.

One of the objects of this invention is to provide an apparatus for measuring condensation nuclei which is characterized by the fact that an electrical output signal is produced which is directly proportional to the nuclei concentration. Presently available instruments for the measurement of condensation nuclei are characterized by the fact that the output signals representative of the nuclei concentrations are not linear in their variation with concentration but are approximately logarithmic functions of the nuclei concentration. One of the consequences of the non-linear relationship between output signal amplitude and nuclei concentration is the necessity of utilizing non-linear or logarithmic scales in conjunction with the ultimate indicating device. Such non-linear characteristics both in the output signal and in the scale are highly undesirable from the standpoint of accuracy and ease of reading. Furthermore, an instrument having such non-linear characteristics lacks sensitivity at very high concentration levels since changes in output signal amplitude with changes in concentration become very small and hard to detect at high concentrations.

Another object of this invention, therefore, is to provide an instrument of increased sensitivity.

Yet another object of this invention is to provide a nuclei measuring apparatus which has a linear scale.

Further objects of this invention will become apparent as the description of the invention proceeds.

The term "condensation nuclei," as utilized in this specification, is a generic name given to small airborne particulate matter which is characterized by the fact that the particles serve as the nucleus on which a fluid, such as water for example, will condense to form droplet clouds. Such condensation nuclei encompass microscopic and sub-microscopic particles, the most important segment of the size spectrum lying in a size range extending from approximately $2.5 \times 10^{-7}$ cm. radius to $1 \times 10^{-5}$ cm. radius although both larger and smaller particles are included within the definition.

To carry out the objects of this invention nuclei bearing gaseous samples are subjected to controlled adiabatic expansion to form droplet clouds about any nuclei present. The droplet clouds scatter a beam of radiant energy which scattered energy is intercepted by a radiation sensitive device, such as a photomultiplier for example, producing an electrical output signal the amplitude of which is a function of the density. The amount of light scattered falls into two distinct portions during one of which the scattered light varies, among other things, linearly with time as a function of the concentration of condensation nuclei, and during the remaining portion of which the scattered light reaches a maximum the value of which is approximately a logarithmic function of the concentration of the nuclei. By differentiating the output signal from the radiation sensitive device an output pulse is obtained the amplitude of which is directly proportional to the slope of the time varying portion of the curve and thus a linear function of the nuclei concentration.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawing in which:

FIGURE 1 is a graph illustrating the relationship of the scattered light intensity as a function of time;

FIGURE 2 shows partially in cross section and partially in block diagram form the novel apparatus of the invention;

FIGURE 3 is a diagrammatic illustration of the electrical circuitry shown in block diagram form in FIGURE 2; and FIGURE 4 shows a graph of the rate of change of scattered light signal with respect to time.

In order to understand and appreciate the principles governing the instant invention more fully, it is desirable to analyze some of the theoretical considerations governing the detection and measurement of condensation nuclei. If a nuclei bearing gaseous sample, such as air for example, containing water vapor or other condensable vapor, is expanded so that supersaturation is achieved condensation occurs on the nuclei resulting in the growth of a droplet. If this process is viewed in an optical chamber in which a light means is so oriented to produce scattered light from the droplets, the scattered light intensity as a function of time will vary in a manner illustrated in FIGURE 1. As can be observed from FIGURE 1, the curve of scattered light plotted against time is constituted of two substantially distinct portions labelled A and B.

The portion A of the curve has a constant slope during which the scattered light S varies linearly with time and increases continually until a maximum value of scattered light $S_{max.}$ is reached, which then remains constant and is represented by the portion of the curve labelled B. According to accepted theory, the portion A of the curve is represented by the equation:

$$S = k\left[\frac{dr^2}{dt}\right] Nt \qquad (1)$$

The maximum scattered light as represented by the portion of the curve labelled B is represented by the equation:

$$S_{max.} = k^{1/3}\left[\frac{3W}{4}\right]^{2/3} N^{1/3} \qquad (2)$$

where:

$k$ = light scattering coefficient $N$ = concentration of condensation nuclei $\dfrac{dr^2}{dt}$ = rate of growth of drop radius squared $W$ = excess condensate available for condensation Presently available instruments for the measurement of condensation nuclei utilize the value of $S_{max.}$, or use attenuated light instead of scattered light, to provide an index of the nuclei concentration. However, as can be seen from an examination of Equation 2 above, such a method produces an approximately logarithmic output as a function of nuclei concentration since $S_{max.}$ is proportional to $N^{1/3}$. Equation 1, however, is directly proportional to the nuclei concentration N and thus offers the possibility of obtaining a signal directly proportional to the nuclei concentration.

That is, by differentiating the scattered light signal produced by a radiation sensitive device an output pulse would be produced, as is illustrated in FIGURE 4, whose amplitude may be defined by the equation:

$$\frac{ds}{dt} = k \left[ \frac{dr^2}{dt} \right] N \qquad (3)$$

The amplitude of the pulse is, therefore, a linear function of the nuclei concentration. The term $$\frac{dr^2}{dt}$$

is a constant for a given degree of supersaturation while the light scattering coefficient, $k$, varies with the instantaneous droplet size the maximum value of which occurs for a relatively small droplet size through which all droplets grow. Consequently, the actual peak pulse height occurs early in the growth process and the maximum value of $k$, as well as the term $$\frac{dr^2}{dt}$$

may be accommodated in the calibration of the instrument and consequently the output of such an instrument is a linear function of the nuclei concentration $N$.

Thus, by combining a differentiating network with an expansion chamber and light scattering detecting means it is possible to produce a nuclei measuring device which has a linear relationship between the measuring parameter, such as scattered light, and the concentration of the nuclei.

Referring now to FIGURE 2 there is illustrated a preferred embodiment of an instrumentality encompassing the principles of this invention wherein there is provided a means defining an expansion chamber adapted to receive and expand nuclei bearing gaseous samples periodically to form droplet clouds. An elongated cylindrical chamber means 1 is coupled by means of a rotary valve 2 to an input conduit 3 through which nuclei bearing gaseous samples at 100% relative humidity achieved through a humidifying means, not shown, are introduced into the chamber. The expansion chamber 1 is also coupled, through the same rotary valve 2, to a conduit 4 which is connected to a vacuum pump, not shown, which applies a fixed pressure differential to the nuclei bearing gaseous sample. Since these samples are introduced at 100% relative humidity the sudden expansion due to the action of the vacuum pump causes an instantaneous supersaturation to be present, the degree depending on the pressure differential applied, causing condensation of the excess vapor about any nuclei present and the formation of droplet clouds, the density of which is proportional to the nuclei concentration. By measuring the density of the droplet clouds thus formed it then becomes possible to determine the number and concentration of nuclei in the individual samples.

To this end there is provided a beam of radiant energy which traverses the expansion chamber 1 which radiant energy is scattered by the presence of the droplet clouds. A source of radiant energy 5, such as an incandescent lamp or the like, is positioned adjacent to one end of the cylindrical expansion chamber 1 and by virtue of a lens assembly 6 mounted in a threaded mounting a beam of energy is projected onto and focussed at a lens 7 positioned in the mid portion of the chamber 1 and supported by means of a barrier member 8. The lens 7 thus acts as an apparent source of the radiant energy and projects the beam through the remaining portion of the expansion chamber onto a transparent exit window 9 mounted in a threaded support assembly and fastened to the opposite end of the cylindrical chamber. A radiation sensitive device 10, such as a photomultiplier or the like, is positioned adjacent to the transparent window element 9 and is adapted to intercept scattered radiation due to the droplet clouds within the expansion chamber to produce an electrical signal proportional to the scattered light.

To insure that only light scattered by droplet clouds impinges upon the radiation sensitive device, the optical assembly within the chamber is so arranged as to prevent the direct passage of radiant energy from the source 5 to the radiation sensitive device 10. Hence, there is positioned on the face of one of the elements of the lens assembly 6 a circular opaque member 11 which blocks a portion of the light projected from the source 5. In this manner there is produced a cone of darkness within a cone of light, the cone of darkness being so proportioned as to encompass the area of the transparent window 9 viewed by the radiation sensitive device.

A second opaque circular disc 12 is fastened to the opposite end of the chamber to further insure that there is no direct transmission of light between the light source 5 and the radiation sensitive device 10. Thus, in the absence of any droplet cloud within the chamber the radiation sensitive device is maintained unilluminated. However, upon the appearance of a droplet cloud within the chamber light is scattered from the cone of light within the chamber which scattered light is intercepted by the radiation sensitive device 10. The scattering area within the chamber is indicated in FIGURE 1 by means of the dappled portion. The radiation sensitive device 10 thus produces an electrical output signal which is proportional to the scattered light which is, in turn, a function of the number of nuclei present.

As pointed out previously, however, the amount of scattered light and consequently the output signal from the radiation sensitive device 10 varies as a function of the nuclei concentration in the manner defined in Equations 1 and 2. Consequently, in order to produce an output signal which varies linearly with the nuclei concentration it is necessary to differentiate the output signal from the radiation sensitive device 10. To this end a differentiating network, indicated in block diagram form, 20, is coupled to the radiation sensitive device 10 and a peak reading voltmeter device 21 is, in turn, coupled to the output of the differentiating network to provide a measure of a pulse amplitude produced thereby. A power supply, indicated generally at 19, provides the necessary operating potentials for the device 10. The actual circuitry of the radiation sensitive device, the differentiating network, and the peak reading voltmeter, will be explained in detail later with reference to FIGURE 2; at this point suffice it to say, however, the electrical output signal from the radiation sensitive device 10 is applied to the differentiating network 20 to produce in its output a pulsating voltage the amplitude of which is a linear function of the condensation nuclei concentration. The pulse amplitude is then applied to a peak reading voltmeter device 21 which then provides an index of the amplitude which may in turn be calibrated directly in terms of nuclei concentration.

The rotary valve assembly 2 which controls the admission of nuclei bearing gaseous samples into the expansion chamber as well as the application of the pressure differential is constituted of a cylindrical hollow body portion 13 having the respective conduits 3 and 4 passing therethrough into communication with the internal portion. Positioned within the hollow central bore of the element 13 is a cylindrical rotor member 14 connected to a drive shaft 15 connected to a source of motive power, not shown, such as an electric motor which drives the rotor at a fixed speed. The valve rotor 14 contains a first recessed portion 16 adapted to come into periodic communication with the conduit 3 to permit the periodic admission of fresh nuclei bearing samples into the chamber. A second axially displaced recessed portion 17 adapted to allow periodic communication between the expansion chamber 1 and the conduit 4 is constituted of a first narrow slotted portion 17*a* communicating with a relatively broad recessed portion 17*b*.

The magnitude and relative position of the recessed portions 16, 17*a* and 17*b* are so arranged that during the course of one revolution of the rotor member 14 conduit 3 communicates with the expansion chamber 1 to permit the inflow of a fresh sample while simultaneously conduit 4 is connected thereto to permit the flushing out of the old sample. Conduit 4 is then shut off while the fresh sample continues to flow into the expansion chamber. Conduit 3 is then closed off while the fresh sample in the expansion chamber is permitted to come to thermal equilibrium. Then conduit 4 comes into communication with the expansion chamber 1 applying a fixed pressure differential from a vacuum pump causing the sample to be expanded and initiating the formation of a droplet cloud.

In order to achieve all of these sequential operations the recessed portion 16 extends for 270° while the narrow, slotted recess 17*a* extends for 90° and the broad recessed portion 17*b* comprises 135° with the leading edge of the narrow recessed portion 17*a* being 90° ahead of the leading edge of the recessed portion 16. In this fashion all of the above described sequential operations are brought about. The precise construction and operation of the expansion chamber 1 and the rotary valve means 2 are disclosed and claimed in Serial No. 600,540 filed July 27, 1956, entitled "Condensation Nuclei Detector," Bigelow et al., and assigned to the General Electric Company.

Although an expansion chamber and rotary valve assembly has been disclosed as the means for producing a droplet cloud about any condensation nuclei, it is clear that other types of such instrumentalities may be utilized without falling outside of the scope of the instant invention. Thus, for example, an expansion chamber and valve assembly of the type illustrated in Patent No. 2,684,008 issued on July 20, 1954, to Bernard Vonnegut may be utilized with equal facility in carrying out the instant invention. Thus, the instant invention is not limited to any particular type of expansion chamber and valve assembly.

Referring now to FIGURE 3, there is illustrated, schematically, the radiation sensitive device and the differentiating and peak voltage reading circuits utilized with the system of FIGURE 2. The radiation sensitive device 10 is, in a preferred embodiment, constitued of a photomultiplying device comprising an anode member 22 connected to a source of positive voltage through an anode resistor, a photoelectric cathode element 23 upon which the scattered light from the expansion chamber impinges. A series of secondary emissive electrodes or dynodes 24 are positioned between the cathode and anode elements to provide the well known electron multiplication taking place within the device. A voltage divider 25, one end of which is grounded the other end of which is connected to a source of negative voltage supplied by the power supply 19, provides voltage for the cathode 23 as well as the individual dynode members 24. As is well known in photomultiplying devices of this type, an electron emitted by the action of light impinging on the cathode 23 is drawn toward the successive dynodes 24, each of which emits a number of secondary electrons for each electron striking it. As a consequence of the secondary emission characteristics of these various elements, a stream of secondary electrons strike the anode 22 to produce an output signal which is proportional to the light intensity striking the cathode 23.

The output signal produced at the anode of the photomultiplier 10 is coupled through a coupling capacitor to the control grid of the triode 26 which amplifies and inverts the signal. The output from the amplifier 26 is coupled directly to a resistance-capacitance differentiating network 20 constituted of a differentiating capacitor 27 connected directly to the anode of the amplifier 26 and a resistance element connected between the capacitor 27 and a source of reference potential such as ground. The relative magnitudes of the differentiating capacitor 27 and the differentiating resistance 28 should be such that the RC time constant of the network is very small with respect to the periodicity of the valve cycle of the apparatus of FIGURE 1; i.e. $RC<<t$. In this manner there is produced at the junction of the differentiating capacitor 27 and the differentiating resistance 28 a pulsating voltage having generally the same configuration as the rate of change of light scattering, $$\frac{ds}{dt}$$

illustrated in FIGURE 4, the maximum amplitude of which is a linear function of the number of condensation nuclei in the gaseous sample.

By measuring the amplitude of this pulsating voltage, which varies linearly with nuclei concentration, it becomes possible to produce an indication of this concentration without utilizing non-linear scales. To this end there is coupled to the output of the differentiating network 20, a peak reading voltmeter circuit 21 of the type which charges a capacitor up to the peak volt value of the voltage pulse applied thereto. The peak reading voltmeter circuit 21 is of the type disclosed and claimed in Serial No. 462,021, filed October 13, 1954, entitled "Electrical Peak Follower Circuit," by Theodore A. Rich and assigned to the General Electric Company, now Patent No. 2,834,933.

The pulse from the differentiating network 20 is applied through a coupling capacitor 29 to the control grid of a normally non-conducting electronic switch 30, which is shown as a triode vacuum tube. The cathode of this tube is connected to one side of a storage capacitor 32 the other side of which is connected to a source of negative potential labelled B—, while the anode of the tube 30 is directly connected to a source of positive potential labelled B+. A resistance 33 is connected between this positive source of potential and a source of reference potential such as ground, and a pair of series connected resistances 34 and 35 are connected between the source of negative potential and ground with resistor 34 providing biasing voltage for tube 30 by having a movable tap thereon connected through a resistance 37 to the control grid of the tube 30.

Connected across storage capacitor 32 and in parallel therewith is a second electronic switch 31, similarly shown as a triode vacuum tube, the anode of this tube being connected to the upper plate of the capacitor 32 and the cathode being connected through a parallel connected capacitor 38 and variable resistance 39 to the source of negative potential B— and consequently the other plate of the capacitor 32. Capacitor 38 and variable resistance 39 are connected in parallel to form the usual type of self bias network, well known in the art, with the adjustability of the resistor 39 being provided so that the self bias of the tube may be varied. The control electrode of the triode 31 is coupled to the differentiating network 20 by means of a coupling capacitor 40 and is connected to the source of negative potential B— through a grid leak resistor 41.

A cathode follower 42 has its control electrode connected to the upper plate of storage capacitor 32 and this output appears across a pair of terminals BB connected between the cathode of the tube 42 to which may be connected any convenient deflecting instrument calibrated directly and linearly in nuclei concentrations. The operation of a peak reading voltmeter such as illustrated in 21 may be explained as follows: Tube 30 is normally biased to cut off by the negative potential applied to its control grid from potentiometer 34 through the resistance 37; while the second switch triode 31 is normally biased to cut off by the positive potential applied to its cathode by virtue of the capacitor 38 and the resistance 39. The positive peak of the pulse voltage applied through the coupling capacitor 29 causes both tubes 30 and 31 to conduct charging capacitor 32 to the peak value of the pulse, while simultaneously charging the biasing capacitor 38 in the cathode circuit of tube 31 to the same value. As soon as the peak value of the voltage pulse drops off, both switch tubes 30 and 31 cease to conduct and return to their normally cut off states. Storage capacitor 32, having no discharge path, remains at the peak of its charge potential which value of voltage is thus applied through the cathode follower 42 to the terminals BB and a deflecting voltage indicating device calibrated directly in nuclei concentration.

However, capacitor 38 gradually discharges through the variable resistance 39, gradually reducing the bias at the cathode of the tube 31 until this bias is overcome by the next input pulse. The second switch tube 31 thus serves to provide a discharge path for the storage capacitor 32 just prior to the time the peak of the input pulse is reached and the switch tube 30 is made conductive. By virtue of the discharge path provided by the switch tube 31 the peak reading voltmeter circuit illustrated in FIGURE 2 is capable of providing an accurate output indication even though variations in the pulse amplitude occur in the negative direction. That is, in the absence of this additional discharge path decreases in the voltage amplitude would not be followed accurately since the storage capacitor tends to hold both its charge level at the previous peak voltage and would not respond to decreasing peaks as rapidly as it does to increasing peaks. However, by virtue of this particular construction a very accurate measure of the pulse peak amplitude is achieved which may then be indicated in terms of condensation nuclei concentration.

It is obvious, of course, to the man skilled in the art, that many different and other types of peak reading voltmeters may be utilized in order to provide a measure of the maximum amplitude of the output pulse from the differentiating network 20, and that the invention is not limited to any particular kind of such instrumentality.

It is clear, then, from the previous description that there is provided a condensation nuclei measuring device wherein the output measuring parameter, such as an electrical signal, is directly proportional to the nuclei concentration present in the individual samples and that, consequently, a much more accurate, sensitive, and simplified apparatus for achieving the desired purposes is provided.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a condensation nuclei measuring device the combination comprising means defining an expansion chamber traversed by a beam of radiant energy and adapted to receive nuclei bearing gaseous samples periodically, radiation sensitive means positioned to intercept radiation modified by nuclei induced droplet clouds and produce an electrical output which is proportional to the number of nuclei, said electrical output having a magnitude which is a non-linear function of the nuclei concentrations, and means to convert said output into one which is a linear function of the nuclei concentration.

2. In a condensation nuclei measuring device the combination comprising means defining an expansion chamber adapted to receive nuclei bearing gaseous samples which are expanded to form droplet clouds, means to measure the scattering effect of said droplet clouds on a beam of radiant energy including a radiation sensitive device for producing an electrical output signal which is a non-linear function of the density of said droplet cloud, and means to differentiate said non-linear output signal to produce a differentiated signal that is a linear function of the droplet cloud producing nuclei concentration.

3. In a condensation nuclei measuring device the combination comprising means defining an expansion chamber traversed by a beam of radiant energy and adapted to receive nuclei bearing gaseous samples, radiation sensitive means positioned to view said chamber and intercept scattered radiation from droplet clouds formed about nuclei to produce an electrical output having a non-linear relationship to the number of nuclei, means coupled to said radiation sensitive means to differentiate said signal whereby the magnitude of said differentiated signal has a linear relationship to the nuclei concentration, and means to measure the magnitude of said differentiated signal as an index of the nuclei concentration.

4. In a condensation nuclei measuring apparatus, the combination comprising means defining an expansion chamber adapted to receive nuclei bearing gaseous samples periodically, a source of radiant energy positioned to project a beam of radiant energy through said chamber to be scattered by droplet clouds formed about nuclei, radiation sensitive means positioned to intercept said scattered radiant energy to produce an electrical signal as an index of the number of nuclei, said signal having a non-linear relationship to the number of nuclei, and a resistance-capacitance differentiating network coupled to said radiation sensitive device to produce an electrical output pulse, the amplitude of which is a linear function of the number of nuclei.

5. In a condensation nuclei measuring apparatus, the combination comprising means defining an expansion chamber adapted to receive nuclei bearing gaseous samples periodically, a source of radiant energy positioned to project a beam of radiant energy through said chamber to be scattered by droplet clouds formed about nuclei, radiation sensitive means positioned to intercept said scattered radiant energy to produce an electrical signal as a function of the number of nuclei, said signal having a non-linear relationship to the number of nuclei, a resistance-capacitance differentiating network coupled to said radiation sensitive device to produce an electrical output pulse the amplitude of which is a linear function of the number of nuclei, and peak reading voltmeter means coupled to said network to measure the amplitude of said output pulse.

References Cited in the file of this patent

UNITED STATES PATENTS 2,684,008    Vonnegut _____ July 20, 1954